United States Patent
van Dal (10) Patent No.: US 9,489,484 B2
(45) Date of Patent: Nov. 8, 2016

(54) DETERMINING A QUANTITY OF TRANSPORTED FLUID

(71) Applicant: SpiritIT B.V., Eindhoven (NL)

(72) Inventor: Han H. van Dal, Lage Mierde (NL)

(73) Assignee: SPIRITIT B.V., Eindhoven (NL)

(*) Notice: Subject to any disclaimer, the term of this patent is extended or adjusted under 35 U.S.C. 154(b) by 907 days.

(21) Appl. No.: 13/672,833

(22) Filed: Nov. 9, 2012

(65) Prior Publication Data

US 2013/0124113 A1    May 16, 2013

(30) Foreign Application Priority Data

Nov. 10, 2011 (NL) .................................... 2007770

(51) Int. Cl.
| | | |
|---|---|---|
| *G06F 19/00* | (2011.01) | |
| *G01F 15/075* | (2006.01) | |
| *G01F 25/00* | (2006.01) | |
| *G01F 15/02* | (2006.01) | |

(52) U.S. Cl.
CPC .............. *G06F 19/00* (2013.01); *G01F 15/024* (2013.01); *G01F 15/075* (2013.01); *G01F 25/0007* (2013.01)

(58) Field of Classification Search
USPC .......................................................... 702/45
See application file for complete search history.

(56) References Cited

U.S. PATENT DOCUMENTS

2013/0220027 A1* 8/2013 Calderin et al. ........... 73/861.42

OTHER PUBLICATIONS

API Standars Dept. "Chapter 21-low Measurement Using Electronic Metering Systems", Oct. 29, 2009, Ballot Revision API 21.1, pp. i-iii and 1-77.*
Dutch Search Report dated Jul. 11,2012. cited in the Foreign Priority Application No. NL 2007770.
"API MPMS Chapter 21: Flow Measurement Using Electronic Metering Systems, Section 1—Electronic Gas Measurement (Ballot Revision)": Oct. 29, 2009.

* cited by examiner

*Primary Examiner* — Mohamed Charioui
(74) *Attorney, Agent, or Firm* — Young & Thompson (57) ABSTRACT

A system for determining a quantity of transported fluid, includes a measured parameter receiver (1) for obtaining a plurality of measured parameters relating to the fluid within the conduit at different measurement times during at least a predetermined time interval. A measured parameter combiner (2) for combining the measured parameters relating to the predetermined time interval, to obtain a first quantity indicative of an amount of fluid that has been transported through the conduit during the predetermined time interval. The system further includes a time interval divider (3) for dividing the predetermined time interval into a plurality of subintervals, and a parameter corrector (5) for determining a corrected value for at least one of the averaged parameters. A quantity corrector (6) for determining a corrected value for the quantity based on the corrected value for the at least one of the averaged parameters.

15 Claims, 4 Drawing Sheets

DETERMINING A QUANTITY OF TRANSPORTED FLUID

FIELD OF THE INVENTION

The invention relates to determining a quantity of transported fluid. The invention further relates to a system, a flow computer, a method, and a computer program product.

BACKGROUND OF THE INVENTION

The performance and accuracy of flow metering systems used for transfer of large quantities of fluids, such as hydrocarbon quantities, is typically checked by periodic verification of the measuring equipment and audits of the metering procedures, data and records.

The correction of measured quantities is often an elaborate activity based on labor-intensive data analysis and most often incomplete information. Assumptions have to be made about the actual occurrence, magnitude and duration of any issue that may have led to a measurement error. Measurement auditing becomes more and more complicated because of the increasing amount of data generated by electronic flow meters, transmitters and process analyzers.

API Manual of Petroleum Measurement Standards (MPMS)—Chapter 21 Flow Measurement Using Electronic Metering Systems Part 1: Electronic Gas Measurement, $1^{st}$ Edition, American Petroleum Institute, 1 Aug. 1993, 38 pages, and API Manual of Petroleum Measurement Standards (MPMS)—Chapter 21 Flow Measurement Using Electronic Metering Systems Part 2: Electronic Liquid Measurement, $1^{st}$ Edition, American Petroleum Institute, 1 Jun. 1998, 60 pages, provides guidelines for performing diagnostics and discrepancy checks by a metering control system. These checks may assist metering engineers to detect or prevent measurement failures. API MPMS further discloses data sampling and averaging techniques that may simplify the correction of measurement errors regarding the transported quantity of fluid.

SUMMARY OF THE INVENTION

It would be advantageous to have an improved way of determining a quantity of transported fluid. To better address this concern, a first aspect of the invention provides a system comprising a measured parameter receiver for obtaining a plurality of measured parameters relating to the fluid within the conduit at different measurement times during at least a predetermined time interval;

a measured parameter combiner for combining the measured parameters relating to the predetermined time interval, to obtain a first quantity indicative of an amount of fluid that has been transported through the conduit during the predetermined time interval;

a time interval divider for dividing the predetermined time interval into a plurality of subintervals;

a parameter associating unit for associating at least one averaged parameter with each of the subintervals, wherein the parameter associating unit comprises an averaged parameter determiner for determining an averaged parameter for a subinterval based on a plurality of the measured parameters having measurement times that fall within the subinterval;

a parameter corrector for determining a corrected value for at least one of the averaged parameters; and a quantity corrector for determining a corrected value for the quantity based on the corrected value for said at least one of the averaged parameters.

The measured parameter combiner, by using the original measured parameters, is capable of determining a relatively accurate estimation of the amount of fluid that has been transported through the conduit. However, in case of errors in the measured parameters, the accuracy of the estimation will be degraded. It will be understood that herein, errors may include any undesired irregularities in the measurement data. The parameter corrector and the quantity corrector allow the estimation to be improved based on fewer parameters, because only the averaged parameters need to be corrected in order to correct the amount of fluid that was determined using the original measurement data. This way, only relatively small storage capacity and/or computational power is needed, because the original, measured parameters are not needed for the correction. In case some of the measured parameters are erroneous, it may be impractical to correct the measured parameters, because of the large amount of data and/or computational effort that would be needed. Also, any corrected values may not be available in the temporal resolution at which the measured parameters were sampled. Consequently, instead the averaged parameters are corrected.

The quantity corrector may comprise a first averaged parameter combiner for combining the averaged parameters associated with the subintervals to obtain a first estimated quantity indicative of the amount of fluid that has been transported through the conduit during the predetermined time interval; and a second averaged parameter combiner for combining the averaged parameters associated with the subintervals, wherein said at least one of the averaged parameters is replaced by the corrected value, to obtain a second estimated quantity indicative of the amount of fluid that has been transported through the conduit during the predetermined time interval.

The quantity of transported fluid may be determined in at least two different ways. First, the measured parameters may be used, as is done by the measured parameter combiner to obtain the first quantity. Second, the averaged parameters may be used, as is done by the first and second averaged parameter combiner to obtain the first and second estimated quantities. Estimations of the quantity of transported fluid are determined based on both the original and the corrected averaged parameters. By comparing these two estimations, the first quantity may be corrected. This typically results in a more accurate estimation of the quantity than the second estimated quantity.

The quantity corrector may be arranged for determining a correction factor based on the first estimated quantity and the second estimated quantity. This correction factor is a factor that accounts for the error in the total quantity that is attributable to the few erroneous measurements. Next, the correction factor may be applied to the first quantity, to obtain an accurate corrected value for the quantity.

The system may comprise an indicator for indicating the corrected value for the quantity to a user. This enables a user to be provided with a highly accurate indication of the transported quantity of fluid. For example, the indicator may be arranged for displaying the quantity on a display.

The system may comprise an interface for receiving the measured parameters while the fluid is transported. This provides the system with on-line information on the transportation of the fluid. Moreover, the system may be arranged for updating the corrected value for the quantity a plurality of times while the fluid is transported. This way, an accurate indication of the transported quantity is obtained during the transportation. It allows to control the transport of the fluid based on the corrected quantity. This enables to transport quantities of fluid with greater accuracy.

The system may comprise an error detector for detecting an error condition in the measured parameters. The error detector may be arranged for triggering the parameter corrector and/or the quantity corrector upon detecting the error condition. This way, the error is corrected during the transportation, providing accurate information about the transported quantity, based on corrected averaged parameters, during the transportation.

The system may comprise a threshold detector for detecting when the corrected quantity exceeds a predetermined threshold value. This enables different applications, including to provide an indication to a user, or to automatically stop transporting fluid when the desired threshold value of fluid has been transported.

The system may comprise a control unit for controlling the transport of the fluid based on the corrected quantity. This allows to control the transport based on accurate information about the transferred amount.

The time interval divider may be arranged for assigning separate subintervals for a period with an error condition and a period without the error condition. This allows to keep as much as possible the averaged parameters relating to periods without error condition. This way, information about periods without error condition is not modified.

The system may comprise a sensor for measuring at least some of the measured parameters. The sensor or sensors can be integrated with the remainder of the system in a single device. However, this is not a limitation. The system may also be made without sensors. For example, the system may interface with the sensors via a direct communications link or via data files.

Another aspect of the invention provides a flow computer comprising a system set forth.

Another aspect of the invention provides a method of determining a quantity of transported fluid, comprising obtaining a plurality of measured parameters relating to the fluid within the conduit at different measurement times during at least a predetermined time interval;

combining the measured parameters relating to the predetermined time interval, to obtain a quantity indicative of an amount of fluid that has been transported through the conduit during the predetermined time interval;

dividing the predetermined time interval into a plurality of subintervals;

associating at least one averaged parameter with each of the subintervals, wherein an averaged parameter for a subinterval is determined based on a plurality of the measured parameters having measurement times that fall within the subinterval;

determining a corrected value for at least one of the averaged parameters; and determining a corrected value for the quantity based on the corrected value for said at least one of the averaged parameters.

Another aspect of the invention provides a computer program product comprising instructions for causing a processor system to perform the method set forth.

It will be appreciated by those skilled in the art that two or more of the above-mentioned embodiments, implementations, and/or aspects of the invention may be combined in any way deemed useful. Modifications and variations of the method and the computer program product, which correspond to the described modifications and variations of the system, can be carried out by a person skilled in the art on the basis of the present description.

BRIEF DESCRIPTION OF THE DRAWINGS

These and other aspects of the invention are apparent from and will be elucidated with reference to the embodiments described hereinafter. The drawings are diagrammatic.

DETAILED DESCRIPTION OF EMBODIMENTS

Figure 1:
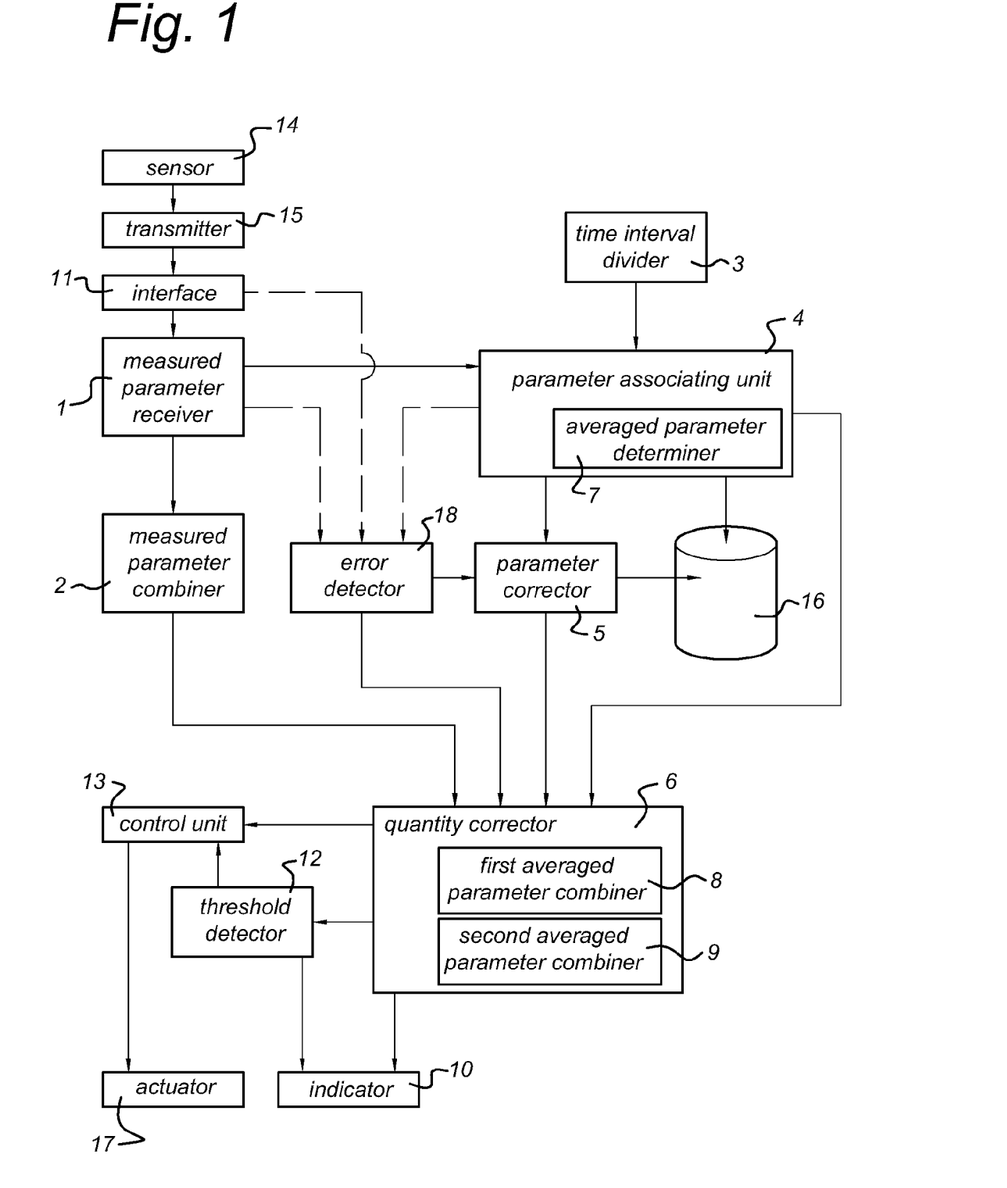
FIG. 1 is a block diagram illustrating aspects of a system for determining a quantity of transported fluid.

FIG. 1 illustrates a system for determining a quantity of transported fluid. Such a system may be used, for example, in conjunction with a fluid transfer system. Such a fluid transfer system may be used in a batch transfer, to transport the fluid from one barrel or vessel to another. For example, the two vessels may be connected via a tube, and the fluid may be pumped through the tube from one vessel to the other. For example, the fluid maybe transported from a tanker into another tanker, or from a tanker into one or more containers or vehicles. Alternatively, fluid transfer system may be used to transport fluid in a continuous mode. For example, a fixed piping may exist between distribution stations of a fluid. This piping may be used to transport a fluid from a source to a target destination in a continuous mode. In both cases, there may be a need to have an accurate control and/or knowledge of the amount of fluid that is transported. Examples of fluids include fuel, oil, gas for use in combustion engines, or for heating purposes. Another example of a transportable fluid is water. However, these examples are not limitations of the system for determining a quantity of transported fluid described herein.

Sensors 14 may be provided in or around the tube to measure physical properties of the fluid in the tube. From these physical properties, the flow speed may be determined, typically by performing a number of computations. Moreover, fixed variables such as the width of the tube may be used in these computations to determine the amount of fluid transported per unit of time. By integration over time, the total amount of fluid that has been transported from one vessel to the other may be determined. It will be understood that the system is not limited to tubes or sensors. For example, the tube could be replaced by an orifice in a wall that separates two vessels. The sensors could be replaced by settings that are used to control a pump.

The system may be implemented at least partly by means of a computer with suitable software loaded thereon. A workstation may be used to execute the software. Alternatively, a processor embedded in a special purpose device may be used. The system may comprise, for example, a display for displaying status information and user input device such as a keyboard, mouse, and/or touch screen, to operate the functions of the system. The system may further comprise an interface 11 for connecting the system with one or more transmitters 15 that are arranged for transmitting information collected by means of the sensors 14. The interface may be implemented, for example, as a network port that connects to a network such as a local area network or the Internet.

For example, the system described herein may be included in a flow computer. Flow computers are known per se in the art of petroleum measurement standards involving measurement using electronic metering systems. They are dedicated devices that are capable of receiving measurement signals relating to the flow of the transported fluid, and perform computations to quantify the amount of fluid transported, and/or the speed with which the fluid is transported. Moreover, the flow computer may perform logging operations, to store the information relating to the transport of the fluid during the period of the transfer. For example, raw sample data may be stored, or averaged information may be stored periodically. Moreover, flow computers may comprises storage means, such as a magnetic disc or tape, to store the log. Alternatively or additionally, the flow computer may comprise a connection to a remote storage system and send the information to be logged to that storage system. The communication to receive and/or transmit (processed or raw) measurement data can be performed via a dedicated communications cable, or via a shared network medium such as a LAN, a wireless interface, or the Internet.

The system may comprise a measured parameter receiver 1 for obtaining a plurality of measured parameters relating to the fluid within the conduit at different measurement times during at least a predetermined time interval. As shown, the measured parameter receiver 1 may be operatively connected to the interface 11 to receive the measured parameters from a transmitter 15. The sensor 14/transmitter 15 may be located close to the measured parameter receiver 1 and the remainder of the system, or be located at a remote location. Alternatively, the measured parameter receiver 1 is arranged for receiving the measured parameters from a storage means (not shown).

The system may comprise a measured parameter combiner 2 for combining the measured parameters relating to the predetermined time interval, to obtain a first quantity indicative of an amount of fluid that has been transported through the conduit during the predetermined time interval. For example, the measured parameters may relate to different physical properties measured with a sampling interval. By combining the measured parameters for a particular time, the instantaneous flow may be determined. By integration of the instantaneous flow over the predetermined period of time, the first quantity may be computed. The system may be arranged for storing the first quantity in a storage system, for logging purposes for example. The system may be arranged for computing the first quantity for successive time intervals, and store the first quantities thus computed in a database system or in a log file, for example.

The system may comprise a time interval divider 3 for dividing the predetermined time interval into a plurality of subintervals. For example, the predetermined time interval may be subdivided into ten subintervals having equal length. The sampling interval of the measured parameters may be significantly smaller than the subintervals, such that the sampling interval contains a plurality of measured parameters measured at different sampling points. For example, the sampling intervals may be an order of magnitude smaller than the subintervals, and the subintervals may be an order of magnitude smaller than the predetermined time interval. For example, the predetermined time interval may be about an hour, the subintervals may be about 5 minutes, and the sampling interval may be about 1 second. However, this is just an example. Typically, the subintervals are chosen small enough that the averaged parameters capture trends in parameter values.

The system may comprise a parameter associating unit 4 for associating at least one averaged parameter with each of the subintervals. The parameter associating unit 4 comprises an averaged parameter determiner 7 for determining an averaged parameter for a subinterval based on a plurality of the measured parameters having measurement times that fall within the subinterval. Typically, different kinds of parameters are measured, corresponding to different sensors and/or different physical properties. Each kind of parameters may be averaged separately. This way, corresponding different kinds of averaged parameters are associated with each time interval. These different kinds of averaged parameters are typically chosen such that they provide sufficient information to compute an estimate amount of fluid that has been transported during the subinterval. These averaged parameters may also be stored, for example in a storage means 16, for future reference and/or for applying corrections, as will be explained hereinafter. The original measured parameters, on the other hand, may be discarded after having been used by the measured parameter combiner 2 and the parameter associating unit 4. However, this is not a limitation.

The system may comprise a parameter corrector 5 for determining a corrected value for at least one of the averaged parameters. For example, a user input unit may be provided that enables a user to indicate particular averaged parameters and their corrected values. Alternatively, automatic and/or digital signal analysis may be performed to determine appropriate corrections for erroneous measured parameters. These corrected values may be stored in the storage means 16 or be transmitted to another device.

The system may comprise an error detector 18 for detecting an error condition in the measured parameters. This error detector 18 may be arranged for triggering the parameter corrector 5 and/or the quantity corrector 6 upon detecting the error condition. The error detector 5 may be implemented in several ways, such as a dedicated piece of hardware with its own sensors that performs a particular check, such as the position of a particular valve or the operating conditions of a fluid pump. Error conditions may also be detected by analyzing the measured parameters, for example by detecting out-of-range value of a measured parameter. The error detector 18 may further be arranged for performing signal analysis on the measured parameters to identify a more subtle error in the measured parameters.

The system may comprise a quantity corrector 6 for determining a corrected value for the quantity. This corrected value may be determined based on the corrected value for said at least one of the averaged parameters. This correction may be performed, for example, by comparing the corrected value with the corresponding averaged parameter. From this comparison, the absolute value of the error in the first quantity may be determined, and the corrected value may be obtained by addition and/or subtraction of the first quantity and the error. For example, by computing the flow for the subinterval based on the erroneous measured parameter, and computing the flow for the subinterval based on the corrected parameter, the difference of these two flows provides an indication of the error.

Alternatively, the quantity corrector 6 may comprise a first averaged parameter combiner 8 for combining the averaged parameters associated with the subintervals to obtain a first estimated quantity indicative of the amount of fluid that has been transported through the conduit during the predetermined time interval. The first averaged parameter combiner 8 is arranged for computing an estimate of the quantity of transported flow based on the averaged parameters. Since these averaged parameters have a lower sampling rate than the originally measured parameters, this first estimate may be less accurate than the first quantity computed by the measured parameter combiner 2.

The quantity corrector 6 may further comprise a second averaged parameter combiner 9 for combining the averaged parameters associated with the subintervals. However, the second averaged parameter combiner operates with data in which the erroneous averaged parameter or parameters are replaced by their respective corrected value. This way, a second estimated quantity indicative of the amount of fluid that has been transported through the conduit during the predetermined time interval is obtained. Since the computation method of the first and second averaged parameter combiner is similar, the first and second estimate may be compared more easily. The first quantity produced by the measured parameter combining unit 2, on the other hand, uses a different computation strategy and/or is based on different data (the measured parameters rather than the averaged parameters), so it may be difficult to directly relate the first quantity with the second estimate of the quantity.

The quantity corrector 6 may be arranged for determining a correction factor based on the first estimated quantity and the second estimated quantity. For example, the correction factor may be a quotient of the first estimated quantity and the second estimated quantity, such as the second estimated quantity divided by the first estimated quantity. The quantity corrector 6 may further be arranged for computing the corrected value for the first quantity as a product of the first quantity and the correction factor.

The system may comprise an indicator 10 for indicating the corrected value for the quantity to a user. For example, the indicator 10 may comprise a display arranged for displaying a numerical value corresponding to the corrected value. The display may also be arranged for displaying the indication in a graphical way, for example as a chart. The indicator 10 may also be implemented as a software unit that controls a graphics driver to cause a display device to produce any one of the above described outputs.

The system may comprise an interface 11 for receiving the measured parameters while the fluid is transported. For example, the interface 11 is operatively connected to a transmitter 15. The transmitter 15 may be operatively coupled to the sensor 14 and transmit the measurement results obtained from the sensor 14 to the interface 11. The system may be arranged for updating the corrected value for the quantity a plurality of times while the fluid is transported. For example, this updated value may be forwarded to the indicator 10, so that constantly (or regularly) an accurate indication of the transported amount of fluid is provided to the user.

The system according to claim 5, further comprising a threshold detector 12 for detecting when the corrected quantity exceeds a predetermined threshold value. Since the corrected quantity may be the most accurate estimation of the transported amount of fluid, this value may be the most suitable value to determine when enough fluid has been transported, for example, in the case when a predetermined amount of fluid has to be transported.

The system may comprise a control unit 13 for controlling the transport of the fluid based on the corrected quantity. The transport of the fluid may be automatically controlled based on the amount of transported fluid. Such control operations may also be performed manually based on the provided corrected quantity. For example, the speed in which the fluid is transported may be reduced when the desired quantity of transported fluid has almost been reached. Moreover, the transport may be stopped when the desired quantity has been reached. This way, the transported amount can be controlled accurately.

The time interval divider 3 may be arranged for assigning separate subintervals for a period with an error condition and a period without the error condition. This allows the corrections and recalculations to be carried out without modifying the data that was not affected by the error.

The system may comprise one or more of the sensors 14 for measuring at least some of the measured parameters. As described above, the system may alternatively be arranged for communicating with the sensors 14, optionally by means of a transmitter 15. If the sensors 14 are integrated in the system, it allows for a more compact and/or efficient design.

Figure 2:
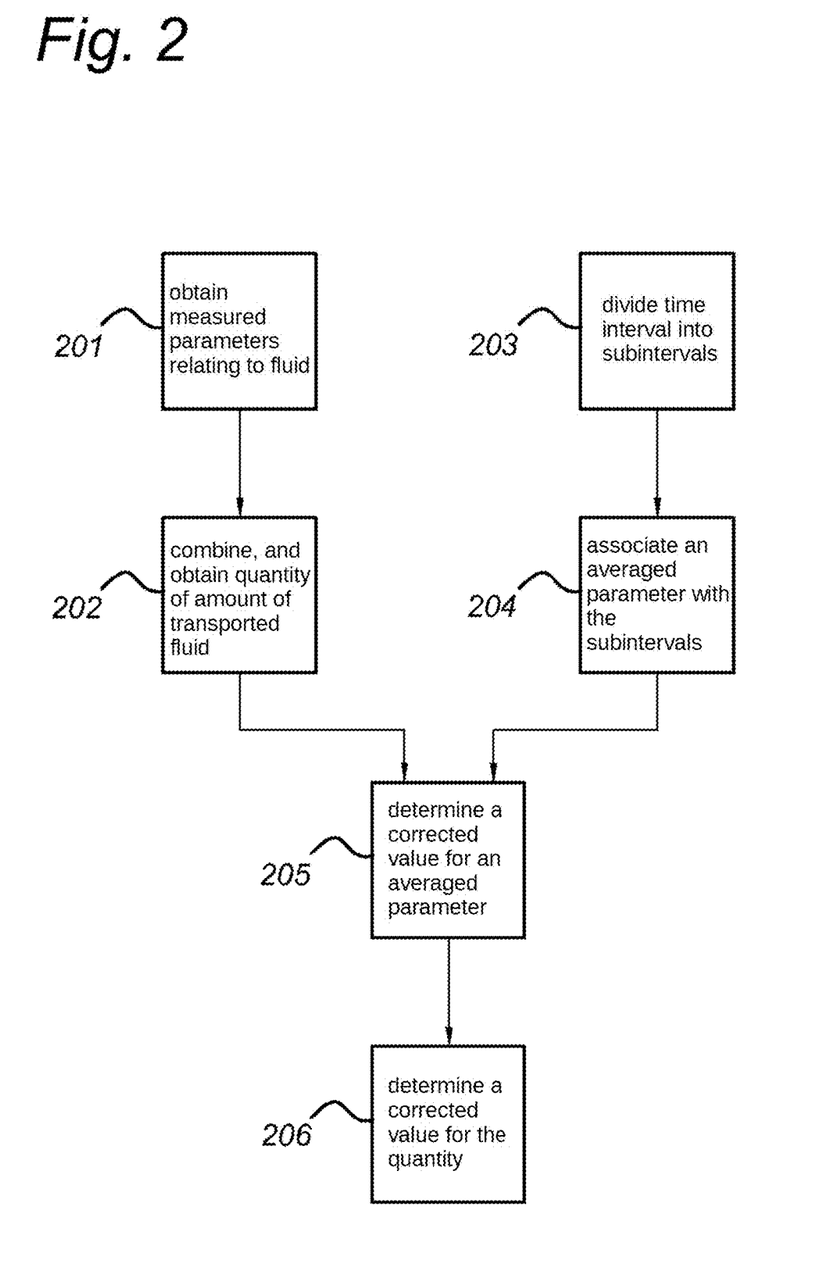
FIG. 2 is a flow chart illustrating aspects of a method of determining a quantity of transported fluid.

FIG. 2 shows a block diagram illustrating a method of determining a quantity of transported fluid.

In step 201, the method obtains a plurality of measured parameters relating to the fluid within the conduit at different measurement times during at least a predetermined time interval. In step 202, the method combines the measured parameters relating to the predetermined time interval, to obtain a quantity indicative of an amount of fluid that has been transported through the conduit during the predetermined time interval. In step 203, the method divides the predetermined time interval into a plurality of subintervals. In step 204, the method associates at least one averaged parameter with each of the subintervals, wherein an averaged parameter for a subinterval is determined based on a plurality of the measured parameters having measurement times that fall within the subinterval. In step 205, the method determines a corrected value for at least one of the averaged parameters. In step 206, the method determines a corrected value for the quantity based on the corrected value for said at least one of the averaged parameters. Since steps 201 and 202 do not use the results of steps 203 and 204, and vice versa, it is possible to perform steps 201 and 202 in parallel with steps 203 and 204. The method then continues at step 205 which uses the results of both steps 202 and 204. The method steps may be repeated in any way deemed useful. For example, steps 201 and 202 may be repeated regularly, as new measured parameters become available, and for increasingly long predetermined time intervals. Alternatively, steps 201 and 202 may be performed for a plurality of successive predetermined time intervals. Steps 203 and 204 may be performed regularly. Typically, the steps 203 and 204 are performed repeatedly, wherein subintervals are added and associated additional averaged parameters are generated as time passes by. Steps 205 and 206 may be performed by default, after the steps 202 and 204 have finished, or only when an error condition has been detected. If no error condition has been detected, the method may set the corrected quantity equal to the first quantity.

The method may be implemented at least partly by means of a computer loaded with appropriate software. To that end, a computer program product can be made that comprises instructions for causing a processor system to perform the method set forth. Moreover, the method may be modified and/or extended based on the description of the system elements.

Mismeasurement management, as referred to herein, relates to the detection and correction of (possibly systematic) measurement errors in hydrocarbon quantities reported by a custody transfer flow metering system. A systematic (deterministic) error is an error due to an assignable cause, such as a transmitter failure, a disturbed meter pulse signal, a faulty parameter value or an incorrect re-calibration. This opposed to a non-deterministic error which is caused by natural variance. The non-deterministic error is expected to cancel out over time.

A transmitter failure may be a systematic error that is usually detected immediately. Instead of using the actual transmitter value the flow computer normally uses an alternative value for its calculations. This value is typically a fixed value or the last good value received from the transmitter. By using the alternative value the flow computer is able to continue the calculation the transferred product quantities, however, it causes an error in the computed quantity of transported fluid, e.g. an error in the first quantity referred to hereinabove.

More subtle systematic errors may be detected by validation of field transmitters and process analysers, meter proving and verification of the flow computer calculations.

Ideally the metering control system automatically validates and analyses metering data in real-time such that that mismeasurement issues are detected instantly and not just at the next validation or the next daily report.

For this purpose several on-line check mechanisms can be provided. The Metering Supervisory Computer may perform backup flow calculations which are continuously compared with the flow rates and totals reported by the flow computers. Also low and high limits may be applied on each measured variable that has an influence on the reported transfer quantities. These limits may be applied to the output of the transmitters and/or the on-line process analysers (e.g. chromatographs, densitometers). It may also include any manual fluid property data that influences the transfer totals, for instance a gas composition and a BS&W value obtained from a laboratory analysis. For a gas composition the low and high limits may be applied on each individual component.

For mismeasurement issues that are detected at a later time, e.g. during an instrument validation or a laboratory analysis, it is sometimes possible to identify the cause of the error and therefore also the date and time when the problem occurred. When no cause can be identified, then the problem could have occurred any time since the latest time that the related device or sample was checked.

To help the user to diagnose mismeasurement issues, the Metering Supervisory Computer may provide overview displays that indicate the relation between production totals and historical information such as trends, alarms, events and log books. When the user selects a specific mismeasurement issue for further analysis, the system may be arranged for showing all the related historical information that may help to diagnose the cause of the problem, including for example detailed data trends of the input variables. The system may suggest corrections of faulty input values based on several rectification methods, or apply such corrections automatically.

With respect to the measurement uncertainty and integrity, the anomalies that may occur in a metering system can be categorized as follows:

Measurement failure: An anomaly is considered a measurement failure when (a part of) the system is not capable to measure and compute flow, e.g. because of a hardware failure or a calculation error. The issue may be detected in 'real-time' in which case the system logs an alarm with a particular start and stop time. A measurement failure may also be detected at a periodic verification of the system e.g. during meter proving or transmitter calibration.

Measurement warning: A measurement warning is a condition where the system is potentially performing out of its specification with respect to overall uncertainty of the measured hydrocarbon quantity, for example a flow meter that is operating outside of its calibrated range for a longer period of time, a flow computer with an incorrect date and time or the change of the mA output scaling in a HART transmitter.

Non-measurement issue: When the alarm condition has no influence on the actual measurement, then it is considered as a 'non-measurement' issue. E.g. when a motor operated valve fails to reach its target position then this is not considered to be a measurement problem, provided that the metering integrity is not jeopardised. Examples of valve failures that jeopardise metering integrity are for instance a crossover valve that is not fully closed causing separate products to mingle or a run to prover valve that is not fully closed while another run is lined up with the prover.

Metering control systems may use the alarms that are generated by the flow computers to detect measurement problems. Some metering control systems do not provide sophisticated functionality to detect less obvious measurement errors. Additional detection methods may be implemented in the system, in particular in the error detector 18 and/or the parameter corrector 5.

One of the known features of electronic flow meters (such as ultrasonic meters and coriolis meters) is the ability to monitor their own health and to provide diagnostics for troubleshooting. Multi-path ultra-sonic flow meters have the additional advantage that they can compare between different measurement paths. Ultrasonic meters are known to perform this internal "health checking" and generate corresponding alarms. The system may be arranged for detecting and signalling measurement problems in real-time by continuously reading the diagnostics information from the meter the system.

Mechanical flow meters do not usually have on-line diagnostics capability. Meter problems are usually detected at meter proving, which may be quite some time after the actual problem has occurred. Proving conditions may differ from the normal process conditions. E.g. measurement problems caused by a specific pump operation may never be detected by proving. Laboratory calibrations may not detect measurement problems in the field e.g. because of slug flow. Measurement accuracy would be significantly enhanced when meter problems are detected as they happen.

For turbine flow meters, relevant diagnostic information can be derived from the pulse signal provided by the pickup-coils. A fingerprint for a single meter revolution can be determined by measuring the time that each turbine blade activates the pick-up coil and also the time between blades. Based on the fingerprint drifts, shifts and inconsistencies can be detected and alarmed upon and typical problems may be detected such as bent blades, bearing wear and debris on the rotor.

Figure 3:
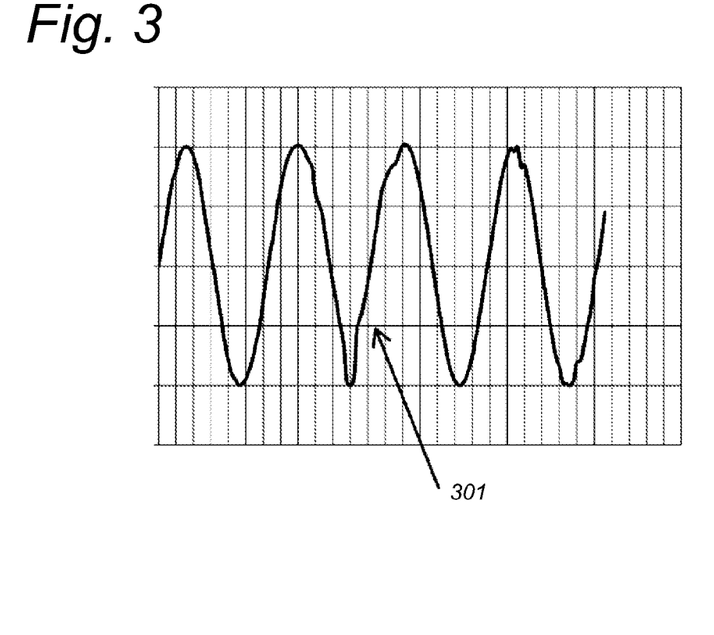
FIG. 3 is an illustration of a turbine fingerprint.

FIG. 3 illustrates such a turbine finger print. It can be seen that the finger print has a periodic signal, which is disturbed at 301. The error detector 18 may be arranged for detecting such an abnormality 301. The parameter corrector 5 may be arranged for correcting such an abnormality. Analysis of the flow profile enables the detection of abnormal flow conditions, e.g. pulsating flow that could influence the accuracy of the meter.

Real-time diagnostics of turbine pulse signals can be performed by a smart pulse pre-amplifier that has a processor for the diagnostics function. Alternatively, modern flow computers may provide programmable digital signal processing hardware running at 1 MHz or faster and are therefore in principle capable of analysing turbine pulse signals.

Consequently, for projects that include mechanical meters providing a pulse signal (e.g. turbine and positive displacement) it may be advantageous to install smart pre-amplifiers or flow computers that provide pulse diagnostic functionality.

For differential pressure type of flow meters (e.g. orifice, venture and cone) the pressure is usually measured at 2 locations, just before and after the flow element. A third pressure transmitter installed downstream of the flow element would result in three independent sets of dP transmitters allowing for comparison and therefore diagnostics. Typical measurement problems that can be detected in this way are reversed installation, blockage, wear, damage and contamination of the flow element.

The installation of a third pressure transmitter downstream of the meter (ideally at the pressure recovery point) may be used in conjunction with differential pressure flow meters. The related diagnostics functionality may be implemented in the flow computer or in the metering control system.

Nowadays most transmitters have HART capability. The diagnostics data and configuration settings from the HART transmitters may be read in real-time and used for alarming and auditing purposes.

Most flow computers apply low and high limit checks on the field inputs such as temperature, pressure and density. The actual low and high limit values are usually set by operations and do not necessarily reflect measurement integrity. Therefore a second set of limit check on the field input may be considered.

Live measurements may be expected to update continuously. An input value can be considered as 'frozen' and therefore invalid when its value does not change over a specific configurable time period, e.g. 30 seconds. The time period should be long enough to tolerate for update times on digital communication links, if applicable.

The rate of change (ROC) of the primary quality data can be checked both in real-time and historically. The instant ROC check verifies that the data does not change faster than a configurable limit at any time. For instance when the temperature of the gas suddenly changes a few degrees Celsius per minute, then there is most likely something wrong with the temperature measurement. Historically consecutive hourly averages may be compared. For a gas chromatograph the main components, being methane, ethane and propane, may be verified against acceptable limits Individual component values should add up to 100%.

Redundant measurements may provide the capability to automatically check for discrepancies.

Examples of redundant measurements include any one or a combination of:

Differential pressure transmitters that (partially) cover the same range.

A redundant set of quality measuring instruments, e.g. dual densitometers or dual gas chromatographs installed in the metering station header.

Redundant measurement of the same property, e.g. a system with both a densitometer and a gas chromatograph.

A fluid property determined in the laboratory from a sampled quantity in relation to the flow-weighted average property as determined by the flow computer over the period that corresponds to the sample.

The theoretical sampled quantity derived from the number of issued grabs in relation to its weight as determined in the laboratory A PRT element in a densitometer or flow meter and the primary temperature transmitter.

Downstream flow meters that are compared with the custody transfer meters.

Several methods may be employed to check for a discrepancy between redundant measurements. The most simplistic check is on the deviation between the actual measurements. This requires a relative high tolerance to allow for process fluctuations and the delay in measurement because the second device is usually located further downstream. CUSUM control charts (ISO/TR 7871:1997) can be applied to determine more subtle discrepancies based on the historical deviation between the two measurements.

Figure 4:
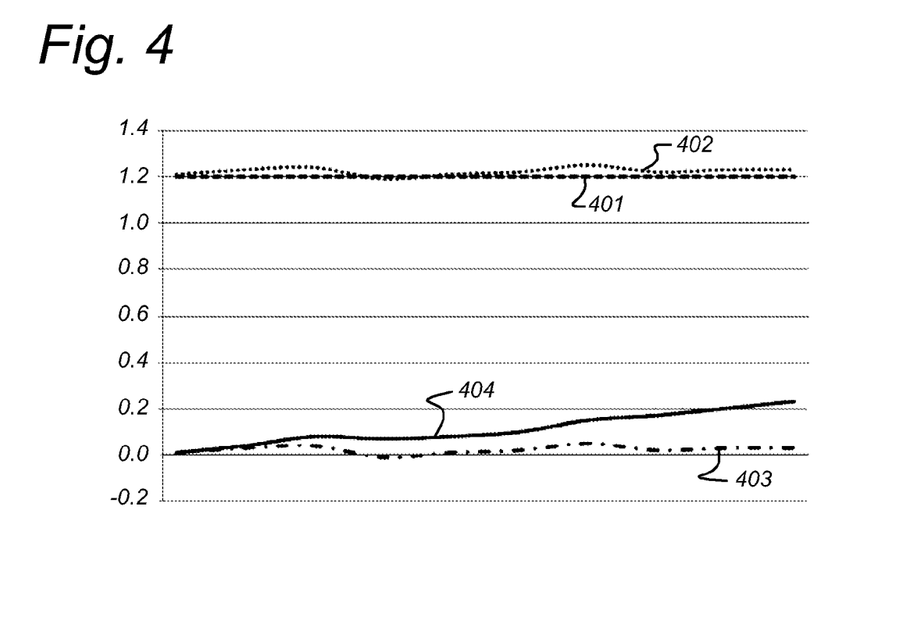
FIG. 4 shows an illustrative graph of an instantaneous and CUSUM deviation quantification method.

FIG. 4 shows an illustration of an instantaneous and cumulative sum (CUSUM) control chart deviation quantification method. CUSUM is a sequential analysis technique known in the art per se. Line 401 represents a first value as a function of time. Line 402 represents a second value as a function of time. Line 403 represents a deviation between the first value and the second value as a function of time. Line 404 represents a value indicative of the shift and/or drift between the two values. This drift has been computed according to the CUSUM method. The CUSUM method is suitable to detect small systematic differences (shift and drift) between two values. The CUSUM chart may be reset whenever equipment that provides one of the redundant measurements is re-calibrated, overhauled or replaced.

Skewhart control charts can be applied to any variable that is verified at a regular basis. Examples of such variables are:

meter factors resulting from proving.

base prover volumes obtained from water draw calibrations.

the weight of sampling bottles determined by laboratory weigh cells.

Meter factor control charts can be maintained for every flow meter that is proved at a regular basis. When the control chart indicates an out of control situation, there might be a problem with either the flow meter or the prover.

The actual weight of a sample can be compared by the theoretical volume that corresponds with the number of grabs that were issued to the auto-sampler and the ratio can be plotted on a control chart. A discrepancy between the values indicates a problem in either the sampling system or the weigh cell.

Limit alarms can also be applied on input variables for which the applicable measurement standards (AGA, API, ISO, etc.) specify a valid range. A measurement warning will be issued when any of these variables gets outside the range specified in the related standard. Some standards like AGA-8 specify wider input ranges when a higher uncertainty is acceptable. The actual limits used shall be in accordance with the contractual arrangements.

API standards specify limits for proved meter factors and for base prover volumes. Corresponding checks can be embedded in the metering control system to ensure compliance with standards.

The correct operation of the measurement system can be verified by applying basic checks. Examples of such checks include the following:

A flow computer should not register flow while the meter run is closed unless maintenance is applied to the flow computer.

An open meter run should indicate flow when parallel runs that are part of the same metering skid are registering flow.

A flow meter should not operate outside its calibrated range for a longer period of time. Most flow meters are calibrated in specific part of the full flow range, typically between 20% and 95%. Operating the meter outside this range cause an increase of the uncertainty.

For a differential pressure (dP) type of flow meter with multiple dP transmitters operating in different dP ranges, the flow computer may use the correct dP transmitter for its flow calculations.

The real-time clock of each flow computer and the Metering Supervisory Computer(s) (MSC) should usually not deviate significantly from an external reference clock. This is especially of interest to continuous production systems in which quantities are reported on a periodic (typically daily) basis.

These checks may be performed on a regular basis, on an ad-hoc basis, or not at all. These checks may be automated in the system. A signal may be generated to inform a user in case of an abnormality.

For ultrasonic flow meters a check can be applied on the speed of sound measured by the meter and the value calculated from the fluid. The speed of sound can be calculated for most products by the applicable equation of state, provided that the actual fluid composition is either known or measured.

The correction of measurement errors may involve the correction (rectification) of the input value and the recalculation of the flow quantity based on the corrected input value, as described above in respect of FIGS. 1 and 2.

There are several rectification methods to correct faulty input data. Possible rectification methods may be based on:

Redundant equipment: Examples are a set of pay and check flow computers and two densitometers installed at the header of the metering station Secondary measurements: Examples of 'secondary' measurements are a coriolis flow meter that as a side-effect measures the density and a densitometer equipped with an internal temperature sensor.

Parallel meter runs or the header: The value of the nearest meter run or the header for pressure, temperature and density may be used instead.

Data before and after a failure: A faulty value may be corrected based the 'healthy' values that were measured before and after the failure. Several averaging methods may be used to determine the correction values such as: Period Average (The average value of a particular period (e.g. 7 days) before and after the mismeasurement), Moving Average (the moving average over a configurable period (e.g. 1 hour) just before the issue occurred), Linear interpolation (the average of the instantaneous values just before and after the failure), and Last good value (the instantaneous value just before the issue occurred is used as the corrected value).

The system may be arranged to calculate the correction value for the different rectification methods and/or to suggest these values to the user.

The system may be arranged to automatically recalculate and/or quantify the impact of any mismeasurement issues.

This may allow the engineer/data analyst to quickly assess all meter tickets and focus on the main issues.

Recalculated reports may be labelled as such in order to distinguish them from the original reports. The system may comprise a report generator arranged to generate a recalculation report that stores the corrected input and report values and describes the calculation methods used for the recalculation (e.g. on additional report pages).

The constants used for the recalculation may be retrieved from the electronic constant log. The default values may be modifiable by the user. The system may provide an undo module arranged to undo recalculations such that data revert to the original values as obtained from the flow computer, in response to a user input. Each modification to and recalculation of the original data can be logged by the system into the electronic logbook.

API MPMS Chapter 21.1 'Flow Measurement Using Electronic Metering Systems' describes online and offline computations to determine custody transfer quantities. The standard discloses two acceptable methods to compute the flow rate from the sampled input data.
1. A full flow rate calculation is performed (at least) once per second based on the sampled input data.
2. If the full flow rate calculation is not performed every second, then the method called Factored Flow Rate Calculation needs to be used instead. This method involves a less frequent flow calculation based on averaged input data.

However, for recalculations it may not be practical to perform a full flow calculation on a second basis. The system disclosed herein may be applied to perform recalculations based on averaged parameters, for example using techniques from the factored flow rate calculation, to correct a quantity that was computed using the full flow rate calculation.

For the Factored Flow Rate Calculation Method, the flow equation may be factored in two parts. One part contains the live inputs that may change considerably with time, while the other part contains the live inputs that remain relatively constant with respect to time.

$$Q_i = IMV \times DV_i \qquad \text{Equation 1}$$

where:
Qi flow rate based on data taken at sample i
IMV Integral Multiplier Value, representing the static variables
DVi Dynamic Variables, representing the live input variables, taken at sample i
For the Factored Flow Rate Calculation the flow quantity is calculated over a number of samples.

$$Q = IMV \sum_{i=1}^{i=n} DV_i \Delta t_i \qquad \text{Equation 2}$$

where:
Q flow quantity over n samples
$\Delta t_i$ sampling interval
The term $\Sigma_{i=1}^{i=a} DV_i \Delta t_i$ is called the Integral Value (IV), such that:

$$Q = IMV \times IV \qquad \text{Equation 3}$$

IMV may be calculated at the end of each integration period using the flow dependent linear averages of the dynamic variables at the end of the period.
Quantity Calculation Period (QCP)

The integration period used for the determination of the IV is called the Quantity Calculation Period (QCP). For example, the QCP may correspond to the subintervals of the system disclosed herein.

$$QCP = \sum_{i=1}^{i=n} \Delta t_i \qquad \text{Equation 4}$$

The standard states that the QCP should not exceed 5 minutes. Longer periods may be used if it can be demonstrated that the additional uncertainty is no more than 0.05%. A new QCP may be started whenever one of the static inputs (live input or constant parameter) changes. To further enhance the recalculation methodology, a new QCP may also be started whenever a measurement alarm or warning changes state.

The MSC may store a record for each QCP to its database. A QCP record contains the data that is used to report and recalculate the hydrocarbon quantity in terms of volume, mass and, in case of natural gas, energy. At least 2 records can to be stored for each QCP, namely a record with the original data and a record with the corrected data.

The following example illustrates the difference between an original and a corrected QCP.

TABLE 1

| BEGIN | END | PRES | TEMP | IV | Q |
|---|---|---|---|---|---|
| 18:20:00 | 18:25:00 | 23.56412 | 36.59324 | 0.5478921 | 12.659321 |
| 18:20:00 | 18:25:00 | 23.56412 | 38 | 0.5478921 | 12.895012 |

The original record contains the unedited values that are calculated from the inputs received from the flow computer. Original QCR records normally can't be modified. These unedited values may correspond to the averaged parameters described above.

The corrected QCP record has the same format as the original record and contains the edited values and recalculated values. The 2 records will be equal as long as no corrections have taken place. These corrected values may correspond to the corrected parameters.

It is possible to distinguish between differential and linear flow meters. Differential flow meters, like an orifice and a venturi flow meter, measure the differential pressure drop over the primary flow element. Because the relation between the differential pressure and the flow is non-linear the averaging and recalculation methodology is different from linear flow meters (e.g. Turbine and ultrasonic flow meters).

For differential meters the dynamic variables include differential pressure, static pressure and temperature. These variables may be sampled at least once per second and a corresponding flow dependent linear average may be determined for each QCP.

The Integral Value for differential flow meters may include the differential pressure and the static pressure, assuming that these two variables may show a relative large fluctuation in comparison to other inputs including temperature.

The following integral value may be applied in case of a differential pressure meter:

$$IV = \sum_{i=1}^{i=n} \left( \sqrt{h_{w,i} P_{f,i}} \, \Delta t_i \right) \qquad \text{Equation 5}$$

wherein:
$h_{w,i}$ differential pressure at sample i
$P_{f,i}$ absolute static pressure at sample i
$\Delta t_i$ sampling interval

Integral Value for Linear Meters

For linear flow meters the volume (or mass) rate at actual conditions as indicated by the flow meter may be included in the Integral Value. Static pressure and temperature are the dynamic variables that may need sampling and averaging.

The Integral Value may include meter linearity data if applied. Linear meters may provide either pulses or a flow rate. In the first case linearity may be through either a K-factor curve or a meter factor curve, while for the latter case a meter factor curve may be applied.

The Integral Value may be calculated as follows by using the pulse count or actual volume accumulator provided by the flow computer.

$$IV = \sum_{i=1}^{i=n} \frac{MF_i}{Kfactor_i} Counts_i \qquad \text{Equation 6}$$

$$IV = \sum_{i=1}^{i=n} MF_i Q_{f,i} \qquad \text{Equation 7}$$

where:
$Counts_i$ pulse increment for sample period i (from accumulator)
$Q_i$ flow increment at actual conditions for sample period i (from accumulator)
$MF_i$ meter factor at sample
$Kfactor_i$ K-factor at sample i

Recalculations for Differential Meters

The main ISO-5167 flow equation for orifice plates is:

$$Q_m = \frac{C}{\sqrt{1-\beta^4}} \varepsilon \frac{\pi}{4} d^2 \sqrt{2\Delta p \rho_f} \qquad \text{Equation 8}$$

where:
Qm mass flow rate
C discharge coefficient
β beta ratio at flowing temperature
ε expansion factor
π 3.14159265
d orifice diameter at flowing temperature
Δp differential pressure
ρf density at flowing pressure and temperature Rewriting this formula using the PTZ relation between flowing and base density reveals the Integral Value in terms of differential pressure and static pressure.

$$Q_m = \frac{C}{\sqrt{1-\beta^4}} \varepsilon \frac{\pi}{4} d^2 \sqrt{\frac{2\rho_b T_b Z_b}{P_b T_f Z_f}} \sqrt{\Delta p P_f} \qquad \text{Equation 9}$$

where:
Pf flowing static pressure absolute
Tf flowing temperature
Zf compressibility at flowing pressure and temperature
ρb density at base pressure and temperature
Pb base static pressure absolute
Tb base temperature
Zb compressibility at base pressure and temperature Recalculations are based on QCP records as stored in the historical database. Such recalculations may be performed, for example, by the first and second averaged parameter combiner described above. For each QCP the Integral Value $\sqrt{\Delta p P_f}$ has been calculated and stored together with the flow-dependent linear averages of the differential pressure, flowing static pressure and flowing temperature. Also the Flowing time (FT) may be stored for each QCP record, which is the time within the QCP that the flow was above the No Flow Cut-off Limit. The remaining variables used in the flow equation may be stored as a constant value to the QCP record or recalculated from the flow-dependent linear averages of the dynamic variables and in case of the compressibility and density, the gas composition. Each QCP record also holds the values for the individual gas components that were determined at the latest chromatograph cycle.

Recalculations for Linear Meters

A main flow equation that may be used for linear meters is:

$$Q_b = \left(\frac{P_f}{P_b}\right)\left(\frac{T_b}{T_f}\right)\left(\frac{Z_b}{Z_f}\right) IV \qquad \text{Equation 10}$$

wherein:
Qb base volume flow rate
Pf flowing static pressure absolute
Tf flowing temperature
Zf compressibility at flowing pressure and temperature
Pb reference static pressure absolute
Tb base temperature
Zb compressibility at base pressure and temperature
IV Integral Value Each QCP record contains the Integral Value, the flow-dependent linear averages of flowing static pressure and flowing temperature, the Flowing time and the gas composition. The reference pressure and temperature are stored in the QCP record, while the compressibility values are calculated.

Quantity Transaction Record (QTR)

API MPMS Chapter 21 applies the term Quantity Transaction Record (QTR) for a meter ticket. A whole number of QCPs may fit in one QTR. This way, the recalculation of an QTR is most accurate when the corresponding QCPs represent exactly the same period of time. For this purpose the MSC ends QCPs at hourly rollovers as well as batch ends.

Two type of QTRs may be stored. The original QTR contains the unedited transfer data as received from the flow computer and usually can't be changed by the user, while the corrected QTR contains the corrected data.

The hydrocarbon quantities of a corrected QTR are calculated as follows:

$$\text{Corrected } QTR = \frac{\Sigma Q \text{ from corrected } QCP}{\Sigma Q \text{ from original } QCP} \times \text{Original } QTR \qquad \text{Equation 11}$$

Case Study

The following case study illustrates the reconciliation method described in this paper. The case involves a single natural gas meter run equipped with a turbine meter and a flow computer. Every hour the flow computer reports the flow quantity together with the flow-weighted averages of the temperature, pressure and density.

Several data reconciliation methods have been tested by simulating a failure of the temperature transmitter for a period of 35 minutes as illustrated the following graph. Note: for reason of simplicity a constant gas composition is assumed over the hour.

Figure 5:
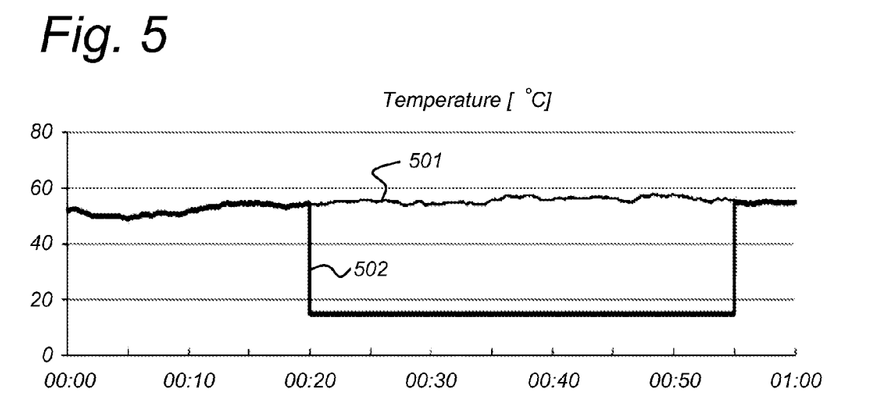
FIG. 5 shows an illustrative graph of temperature versus time.

FIG. 5 illustrates temperature (vertical axis) against time (horizontal axis). Curve 501 shows an example temperature curve that does not have an error. Curve 502 shows an example (simulated) temperature curve with a 35 minute failure from 00:20 to 00:55. The curve 502 shows that during the failure the flow computer has used a constant value of 15 degrees Celsius.

Figure 6:
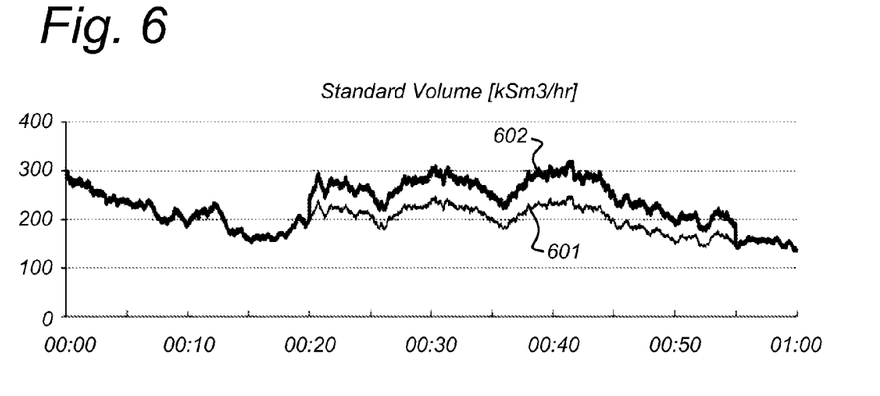
FIG. 6 shows an illustrative graph of standard volume versus time.

FIG. 6 shows a plot of the standard volume flow rate (vertical axis) against time (horizontal axis), corresponding to a measurement including the temperature measurements of FIG. 5. Curve 601 shows the volume flow rate without the fault, based on temperature curve 501, whereas curve 602 shows the volume flow rate as computed with the temperature curve 502 containing the fault. Without the fault, the flow computer would have calculated a quantity of 201993 Sm3 over the hour. Because of the fault, the hourly total reported by the flow computer equals 232020 Sm3, causing an overrating of 14.6% for the reported hour.

In the following, two examples of rectification methods are given. These rectification methods may be used, for example, to obtain corrected values for the erroneous measured temperature:

1. The average of the temperature value at the start and end of the hour is taken as the corrected value for the entire hour. This method uses hourly snapshot figures obtained from for example the flow computer, a station computer or a data historian.
2. The methodology described above to correct the original quantity as computed by full flow rate calculation, corrected by a correction factor computed using factored flow rate calculations for both corrected and uncorrected data.

For the first method the corrected flow quantity may be determined as follows:

$$\text{Corrected } QTY = \frac{QTY \text{ from corrected hourly averages}}{QTY \text{ from original hourly averages}} \times \text{Original } QTY \quad \text{Equation 12}$$

For the 2$^{nd}$ method the corrected flow quantity may be calculated as per Equation 11. To quantify the error of the correction methods a reference value may be calculated first. The reference value is the value that would have been calculated by the flow computer when the temperature correction were recomputed using full flow rate calculation with linear interpolation during the period of the failure. The latter method needs the original data sampled at one second intervals.

In the example shown, the deviation from this reference value (being 202442 Sm3) was as follows for the two methods:

| Method 1 | 202215 Sm3 | 0.21% |
| Method 2 | 202469 Sm3 | 0.01% |

The case study illustrates that the correction method 2 is more accurate than the correction method 1. Multiple case studies have shown that the method described in this document is about 10 to 20 times more accurate than conventional data reconciliation methods.

API MPMS Chapter 21 specifies two distinct methods to determine the quantity for a flow measurement system.

Method 1: The Full Flow Rate Calculation method involves calculating the flow rate at the sampling interval, which is normally 1 second or less, based on the live input variables. The Full Flow Rate Calculation may be preferred in many cases, because its accuracy is greater than the Factored Flow Rate Calculation.

Method 2: The alternative method is the Factored Flow Rate Calculation method, wherein the computation is separated into an Integral Multiplier Value (IMV), representing the relatively static measured and calculated values, and an Integral Value (IV) representing time-varying aspects of the flow computation. In the Factored Flow Rate Calculation, the flow rate is typically calculated for an interval of 5 minutes or less, based on the IMV and IV. The interval time at which the factored flow rate is calculated is called the QCP (Quantity Calculation Period). For each QCP the quantity of transported fluid can be calculated by multiplying the calculated flow rate by the QCP time.

API MPMS Chapter 21 states that the quantity shall be reported on an hourly (or daily) basis (paragraph 1.5.1) in a so-called Quantity Transaction record (QTR) with the hourly quantity being the sum of the quantities that are determined by either method. As to the Factored Flow Rate Calculation method, the reported quantity may be calculated as follows:

$$\text{Reported Quantity} = \sum_{i=1}^{n} \text{Calculated Quantity}(i)$$

wherein 'n' is the number of Quantity Calculation Periods (QCP) that corresponds to the Quantity Transaction Record (QTR), and Calculated Quantity(i) is the quantity corresponding to the i-th QCP.

API MPMS Chapter 21 Annex C discloses the following correction methodology for reported QTR quantities:

$$\text{Corrected Volume} = \frac{\text{Recalculated } Volume_{Corrected\ Values}}{\text{Recalculated } Volume_{Original\ Reported\ Values}} \times \text{Reported Volume}.$$

To increase accuracy of corrected quantities, techniques to correct a first quantity computed using the full flow rate calculation, for example for a time interval corresponding to a QTR, may be corrected using the factored flow rate calculation to compute a correction ratio. Inter alia, the following methodology for the correction of reported quantities obtained with the full flow rate calculation method is proposed in this disclosure:

$$\text{Corrected Quantity} = \frac{\text{Recalculated Quantity (Method 2)}_{Corrected\ Values}}{\text{Recalculated Quantity (Method 2)}_{Original\ Reported\ Values}} \times$$
$$\text{Reported Quantity (Method 1)}$$

wherein $$\text{Recalculated Quantity (Method 2)}_{Corrected\ Values} = \sum_{i=1}^{n} \text{Calculated Quantity (Method 2)}_{Corrected\ Values\ (i)},$$

and $$\text{Recalculated Quantity (Method 2)}_{Original\ Reported\ Values} = \sum_{i=1}^{n} \text{Calculated Quantity (Method 2)}_{Original\ Reported\ Values\ (i)}.$$

Herein, Reported Quantity (Method 1) is the Reported Quantity computed with the Full Flow Rate Calculation method with the originally measured live input variables. Recalculated Quantity (Method 2)$_{Original\ Reported\ Values}$ is the quantity computed with the Factored Flow Rate Calculation method, wherein the input variables are averaged over each QCP. Recalculated Quantity (Method 2)$_{Corrected\ Values}$ is the Recalculated Quantity computed with the Factored Flow Rate Calculation method, using the input variables that were averaged over each QCP, wherein at least one of the averaged input variables has been corrected. Calculated Quantity (Method 2)$_{Original\ Reported\ Values}$(i) is the quantity for the i-th quantity calculation period (QCP) of a quantity transaction record (QTR), as calculated by the Factored Flow Rate Calculation method, using the original reported values for the averaged input variables. Calculated Quantity (Method 2)$_{Corrected\ Values}$(i) is the quantity for the i-th quantity calculation period (QCP) of a quantity transaction record (QTR), as calculated by the Factored Flow Rate Calculation method, using the corrected values for the averaged input variables.

For the purpose of the recalculations, not only the (e.g. hourly) QTR records with quantities computed using method 1 (and optionally method 2) may be stored (for example in a local memory), but also the averaged input variables for each QCP, at least insofar they are necessary for recalculations of quantities corresponding to individual QCP's according to Method 2, are stored.

In an embodiment, the volumes are computed in the flow computer using both Method 1 and Method 2 simultaneously and independently of each other. The QCP data generated by Method 2, including parameters used to compute e.g. integral value (IV) and/or Integral Multiplier Value (IMV), for each QCP, are stored. These parameters may be used later for recalculations, by computing a corrected volume with Method 2 using corrected values of these parameters. For example, such a recalculated volume could correspond to the period covered by a particular QTR. The ratio of the recalculated volume based on corrected averaged input variables using Method 2 and the recalculated volume based on original averaged input variables using Method 2 may then be used to correct the volume that was originally computed based on the live input variables using Method 1, by multiplying that ratio with the original reported volume of Method 1.

In an alternative embodiment, the volumes are computed in the flow computer using Method 1. These volumes are stored and stored in a QTR. Moreover, the averaged input variables, corresponding to QCP's and necessary for recalculations according to Method 2, as described in the previous embodiment, are computed and stored. The volumes do not need to be computed in the flow computer using Method 2 simultaneously with the volumes computed using Method 1. In case a correction is made, the recalculations can be performed as described in the previous embodiment using the Reported Value according to Method 1 and the averaged input variables for the appropriate QCP's.

It will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention. It will also be appreciated that such a program may have many different architectural designs. For example a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a flash drive or a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for determining a quantity of transported fluid, comprising:
an interface that receives a plurality of measured parameters corresponding to measurements directed to a fluid within a conduit at different measurement times while the fluid is transported;
a measured parameter receiver for obtaining the plurality of measured parameters relating to the fluid within the conduit at the different measurement times during at least a predetermined time interval;
a measured parameter combiner for combining the measured parameters relating to the predetermined time interval, using a full flow rate calculation, to obtain a first quantity indicative of an amount of fluid that has been transported through the conduit during the predetermined time interval;
a time interval divider for dividing the predetermined time interval into a plurality of subintervals corresponding to respective quantity calculation periods (QCPs);
a parameter associating unit for associating at least one averaged parameter with each of the subintervals, the parameter associating unit comprising
an averaged parameter determiner for determining an averaged parameter for a subinterval based on a plurality of the measured parameters having measurement times that fall within the subinterval,
the measured parameter combiner, the time interval divider, the parameter associating unit, and the averaged parameter determiner performing said combining, dividing, associating, and determining repeatedly as new measured parameters are received;
a parameter corrector for determining a corrected value for at least one of the averaged parameters; and
a quantity corrector for determining a corrected value for the first quantity based on the corrected value for said at least one of the averaged parameters, the quantity corrector comprising
a first averaged parameter combiner for combining the averaged parameters associated with the subintervals, using a factored flow rate calculation, to obtain a first estimated quantity indicative of the amount of fluid that has been transported through the conduit during the predetermined time interval, and
a second averaged parameter combiner for combining the averaged parameters associated with the subintervals, using the factored flow rate calculation, wherein said at least one of the averaged parameters is replaced by the corrected value, to obtain a second estimated quantity indicative of the amount of fluid that has been transported through the conduit during the predetermined time interval.

2. The system according to claim 1, wherein the quantity corrector is arranged for determining a correction factor based on the first estimated quantity and the second estimated quantity.

3. The system according to claim 2, wherein the quantity corrector is arranged for determining a corrected value for the first quantity using a formula $$\text{Corrected } QTR = \frac{\Sigma Q \text{ from corrected } QCP}{\Sigma Q \text{ from original } QCP} \times \text{Original } QTR$$

wherein:
Corrected QTR is the corrected value for the first quantity,
Original QTR is the first quantity,
$\Sigma Q$ from original QCP is the first estimated quantity, and
$\Sigma Q$ from corrected QCP is the second estimated quantity.

4. The system according to claim 1, comprising an indicator for indicating the corrected value for the quantity to a user.

5. The system according to claim 1, further comprising: an interface for receiving the measured parameters while the fluid is transported,
wherein the system is arranged for updating the corrected value for the quantity a plurality of times while the fluid is transported.

6. The system according to claim 5, further comprising: an error detector for detecting an error condition in the measured parameters,
wherein the error detector is arranged for triggering the parameter corrector and/or the quantity corrector upon detecting the error condition.

7. The system according to claim 5, further comprising: a threshold detector for detecting when the corrected quantity exceeds a predetermined threshold value.

8. The system according to claim 5, further comprising: a control unit for controlling the transport of the fluid based on the corrected quantity.

9. The system according to claim 1, wherein the time interval divider is arranged for assigning separate subintervals for a period with an error condition and a period without the error condition.

10. The system according to claim 1, further comprising: a sensor for measuring at least some of the measured parameters.

11. A flow computer comprising the system according to claim 1.

12. A method of determining a quantity of transported fluid, comprising:
receiving, via an interface, while a fluid is transported through a conduit, a plurality of measured parameters relating to the fluid at different measurement times during at least a predetermined time interval;
combining the measured parameters relating to the predetermined time interval, using a full flow rate calculation, to obtain a quantity indicative of an amount of fluid that has been transported through the conduit during the predetermined time interval;
dividing the predetermined time interval into a plurality of subintervals corresponding to respective quantity calculation periods (QCPs);
associating at least one averaged parameter with each of the subintervals, wherein an averaged parameter for a subinterval is determined based on a plurality of the measured parameters having measurement times that fall within the subinterval,
the steps of combining, dividing, associating being performed repeatedly as new measured parameters are received;
determining a corrected value for at least one of the averaged parameters; and
determining a corrected value for the first quantity based on the corrected value for said at least one of the averaged parameters, including the sub-steps of
combining the averaged parameters associated with the subintervals, using a factored flow rate calculation, to obtain a first estimated quantity indicative of the amount of fluid that has been transported through the conduit during the predetermined time interval, and
combining the averaged parameters associated with the subintervals, using the factored flow rate calculation, wherein said at least one of the averaged parameters is replaced by the corrected value, to obtain a second estimated quantity indicative of the amount of fluid that has been transported through the conduit during the predetermined time interval.

13. A non-transitory computer readable medium encoded with a computer program product comprising instructions for causing a processor system to perform the method according to claim 12.

14. The method according to claim 12, further comprising:
prior to said obtaining step, providing a sensor that measures and outputs at least one of the measured parameters; and
causing the sensor to sense the at least one of the measured parameters from the conduit transporting the fluid.

15. The method according to claim 12, further comprising:
storing the at least one of the measured parameters in a memory device.

* * * * *